United States Patent
Pai

(10) Patent No.: US 7,283,124 B2
(45) Date of Patent: Oct. 16, 2007

(54) MOUSE SCROLL WHEEL MODULE

(76) Inventor: Min-Fang Pai, 5F/2, No. 192, Sec. 2, Chung Hsin. Rd., Hsin Tien City, Taipei County (TW)

( * ) Notice: Subject to any disclaimer, the term of this patent is extended or adjusted under 35 U.S.C. 154(b) by 678 days.

(21) Appl. No.: 10/901,978

(22) Filed: Jul. 30, 2004

(65) Prior Publication Data
US 2006/0022944 A1 Feb. 2, 2006

(51) Int. Cl.
*G06F 3/033* (2006.01)
*G05G 9/047* (2006.01)

(52) U.S. Cl. ............... 345/167; 345/163; 345/167; 345/184; 74/471 XY

(58) Field of Classification Search ............ 345/161, 345/163–167, 184; 463/37, 38; 74/471 XY
See application file for complete search history.

(56) References Cited

U.S. PATENT DOCUMENTS 6,995,747 B2 * 2/2006 Casebolt et al. ............ 345/157

2004/0150623 A1 * 8/2004 Ledbetter et al. ........... 345/163

* cited by examiner

*Primary Examiner*—Richard Hjerpe
*Assistant Examiner*—My-Chau T. Tran
(74) *Attorney, Agent, or Firm*—Lowe Hauptman Ham & Berner, LLP

(57) ABSTRACT

A mouse scroll wheel module includes a retention part, a holding part sitting on the retention part to swing from front to back and from left to right, a revolving part installed on the holding part, a mechanical revolving encoder to receive output of encoded electronic signals as the revolving part rotates, and a circuit board for controlling a middle switch and right and left switches, fixed between the retention part and the holding part. The holding part comprises a swing base and a holder that supports the swing base. With the support of the holding part, the scroll wheel of the revolving part is able to rotate and swing laterally, making the currently selected window on the screen to scroll in four directions: up, down, left or right.

2 Claims, 7 Drawing Sheets

MOUSE SCROLL WHEEL MODULE

BACKGROUND OF THE INVENTION

I. Field of the Invention

This invention relates generally to a computer mouse scroll wheel module and, more specifically, to a computer mouse module comprising a mechanical revolving encoder and a holding part, which consists of a swing base and a holder supporting the swing base. With the holding part, the scroll wheel of the revolving part is able to rotate and swing laterally so that the window on the screen can be scrolled up, down, left or right, accordingly.

II. Description of the Prior Art

Heretofore, it is known to construct a computer mouse to translate the motion of user's hand into signals that the computer can use. A computer mouse of such construction is typically used to move the cursor, point to a specific object on the screen, scroll up, down, left and right. A computer mouse of this kind usually has a scroll wheel or buttons for user to rotate or click by fingers. The rotation or click drives the components inside the mouse's body, and the movement of the components is to be translated into electronic signals sent to the computer.

Computer mice with the heretofore known scroll wheel or buttons have a variety of patented designs. Refer to Taiwanese patent publication No. 320302-"Third Input Axle In Computer Mice" (application No. 85208070), a scroll wheel can be rotated to provide input translated into scrolling up or down in the currently selected window on the screen. The scroll wheel can also be swayed up and down to switch between scrolling modes.

For Taiwanese patent publication No. 461548 (application No. 87208877) "Improved Structure Of A Third Input Axle In Computer Mice", a scroll wheel has more functions than just rotating to provide input. The scroll wheel hangs on a set of pillars with a restricting horizontal shaft going through the scroll wheel. At one end of the restricting shaft is there a small wheel, which can be pressed down so that the restricting shaft bends and bounces back laterally like a fishing rod. As the scroll wheel is pressed down to bend, the small wheel at the end bends down simultaneously to reach the power switch. In other words, the scroll wheel is able to bend to trigger the device to send signals.

Refer to the "Improved Structure Of Key-Free Mouse" receiving Taiwanese patent publication No. 543872 (application No. 90204174), the "Key-Free Mouse" receiving Chinese publication No. CN2476843Y (patent No. ZL01207387.3) and the "Key-Free Mouse" "issued as U.S. Pat. No. 7,164,412", all disclose the same structure of computer mouse, in which a pin and a slot are pivoted to form a revolving axle oriented perpendicular to the mouse surface. The mouse body can therefore be swayed left or right to produce signals as the buttons do.

The heretofore known computer mouse is typically designed to have a scroll wheel or buttons to sway in either the X direction or the Y direction, instead of having buttons to be pressed. Moreover, refer to the U.S. Patent application with publication No. 2003/0025673 A1—"Input Device Including A Wheel Assembly For Scrolling An Image In Multiple Directions", the scroll wheel of the mouse has the technique of swaying in both X direction and Y direction as described in the above mentioned prior arts. Since these prior arts have elements and module designs different from each other, they can be patented separately.

SUMMARY OF THE INVENTION

It is therefore a primary object of the invention to provide a simplified and easy-to-assemble computer mouse scroll wheel module that by applying a mechanical revolving encoder and a holding part comprising a swing base and a holder supporting the swing base, the scroll wheel of the revolving part is able to rotate and also sway laterally. The movement of the scroll wheel produces signals to be translated into scrolling up, down, left or right within the currently selected window on the screen.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFFERED EMBODIMENT

Figure 1:
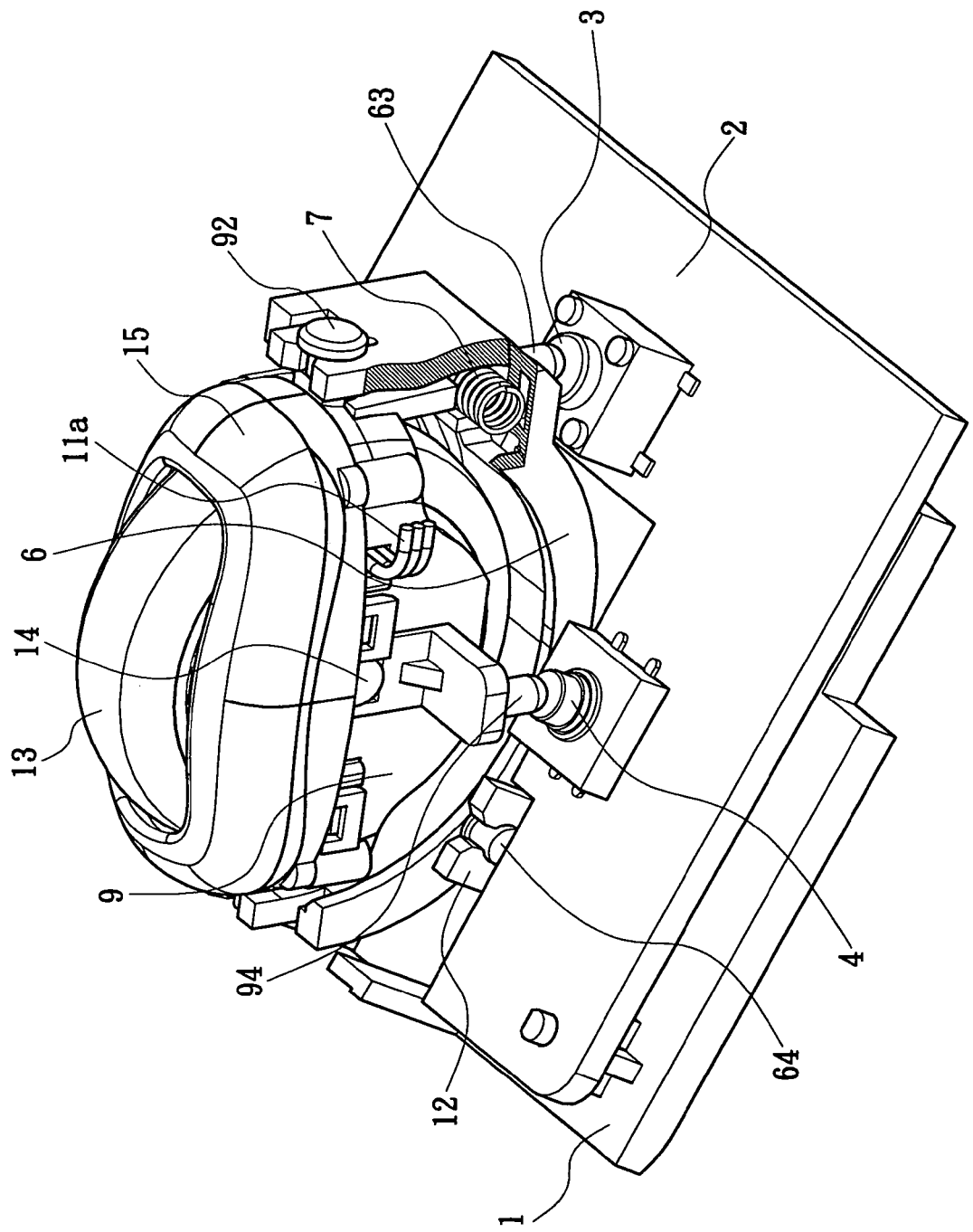
FIG. 1 is a perspective view of a scroll wheel module in accordance with the present invention.
Figure 2:
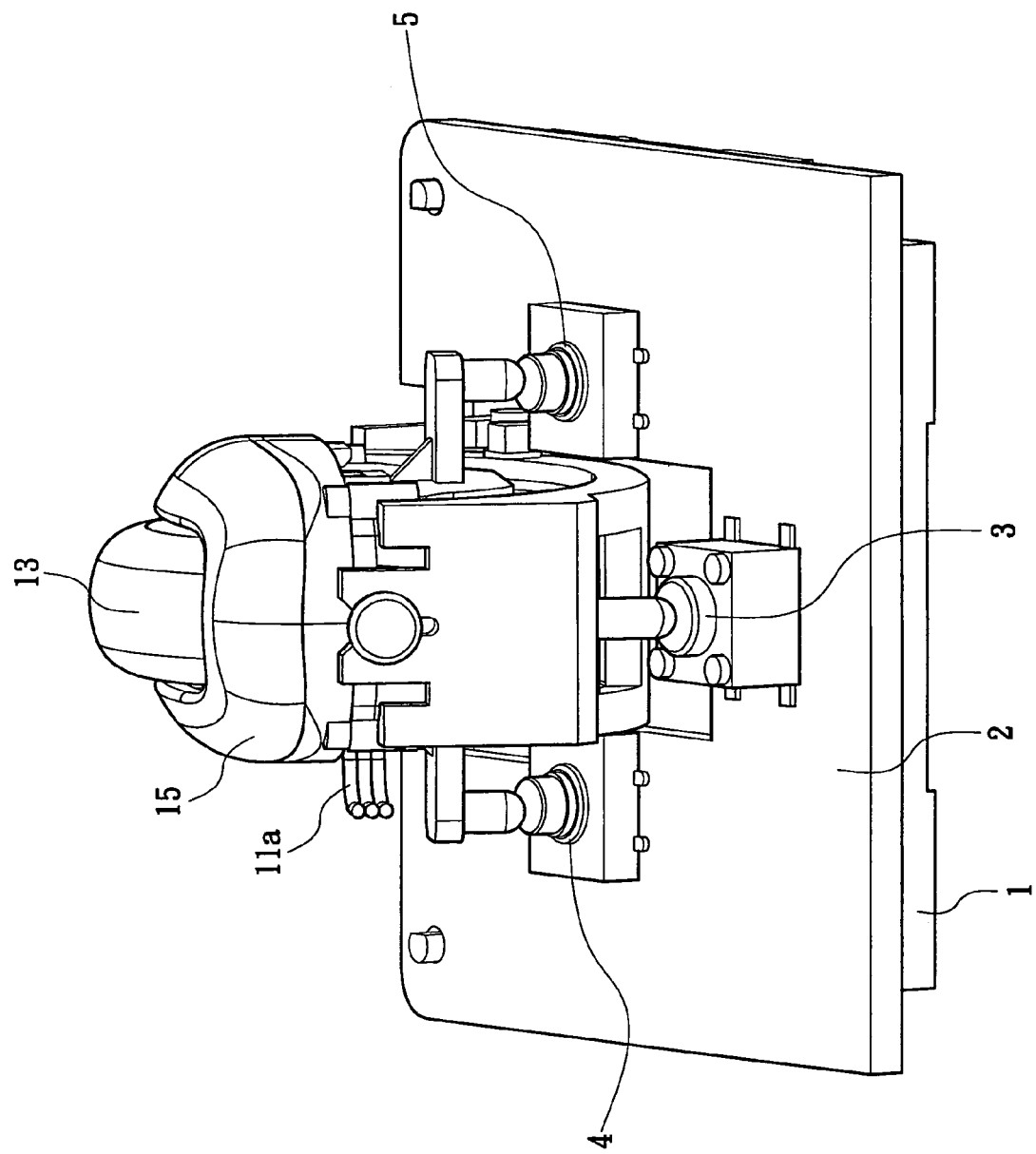
FIG. 2 is a perspective view of the present invention.
Figure 3:
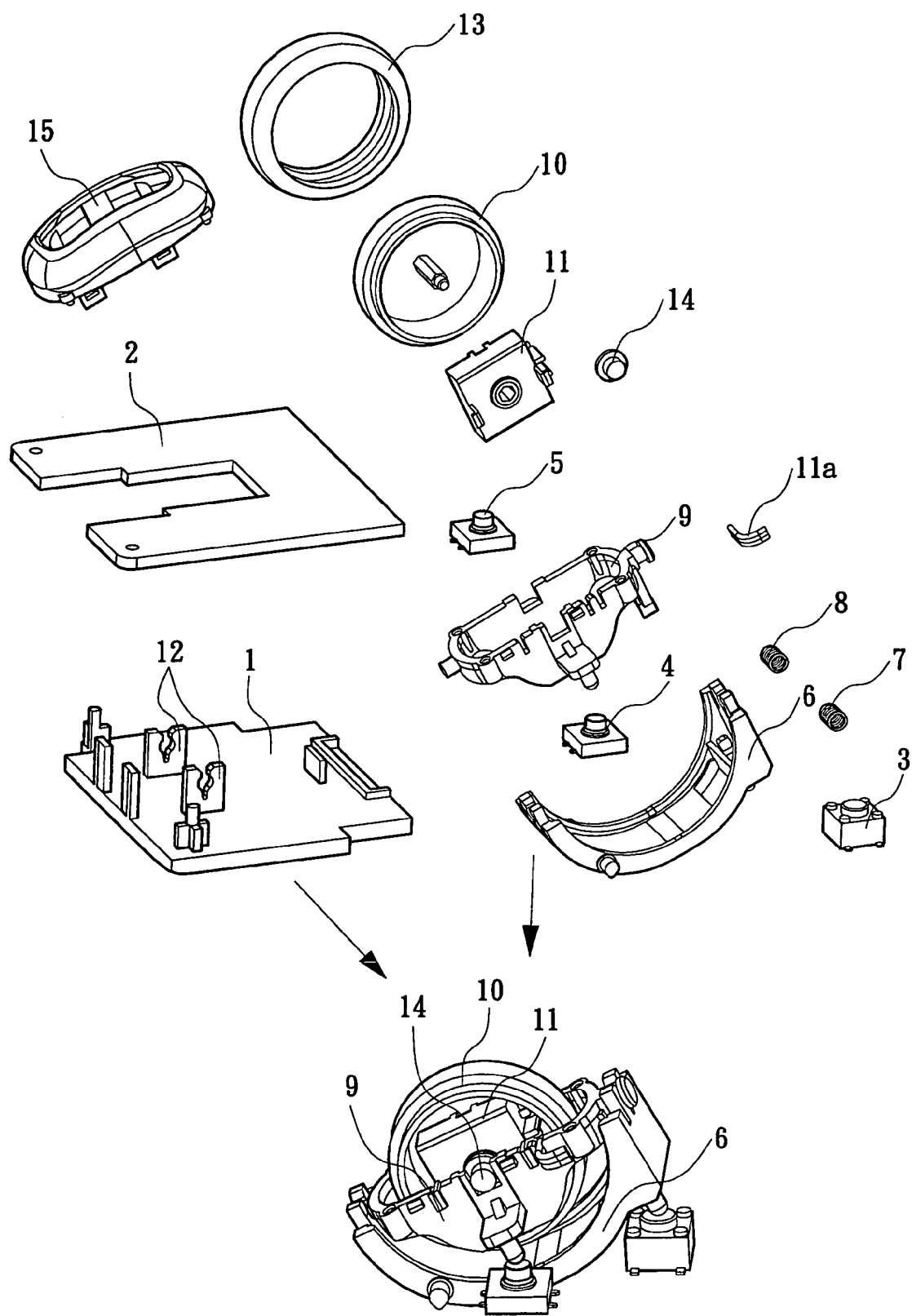
FIG. 3 is an explosive view of the present invention.
Figure 4:
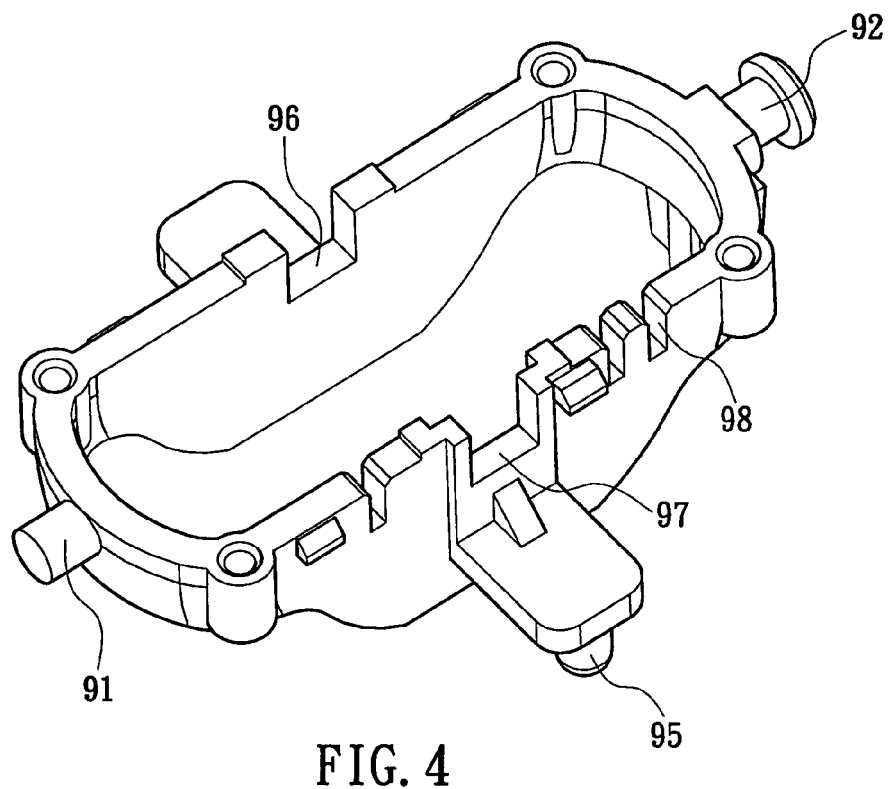
FIG. 4 is an enlarged view of a swing base in accordance with the present invention.
Figure 5:
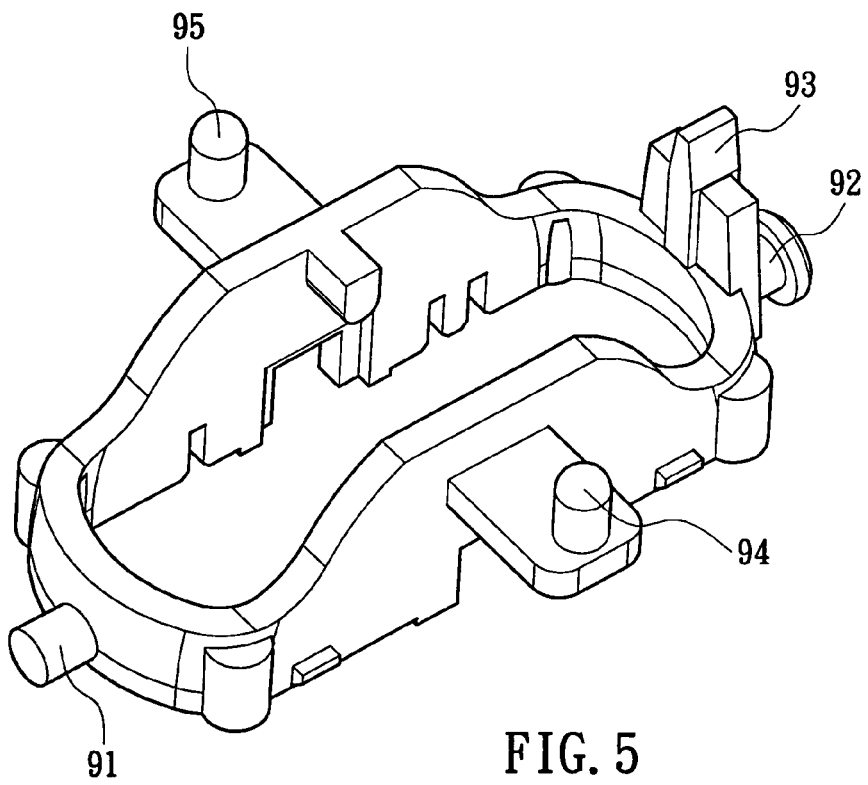
FIG. 5 is a rear view of FIG. 4.

Referring to FIG. 3, FIG. 4 and FIG. 5, the present invention involves a computer mouse scroll wheel module, of which the components can be put together according to the fragmentary view drawn in FIG. 3. A circuit board 2 with a middle switch 3, right and left switches 4, 5 is set on the bottom cover (the retention part) 1. The circuit board 2 has a slot for accommodating the holding part, comprising a swing base 9 and a holder 6 supporting the swing base 9. At the front end of the swing base 9 is there a front shaft 91, and the rear a rear shaft 92. On the left side of the swing base 9 is there a left contact pin 94 extending outwards and the right side a right contact pin 95 extending outwards. In the rear bottom of the swing base 9 is there a traverse momentary stick 93. On both sides of the swing base 9 are there slots 96, 97 for holding the shaft of the scroll wheel. On one side of the swing base 9 is there an electric wire slot 98 for the mechanical revolving encoder 11.

Figure 6:
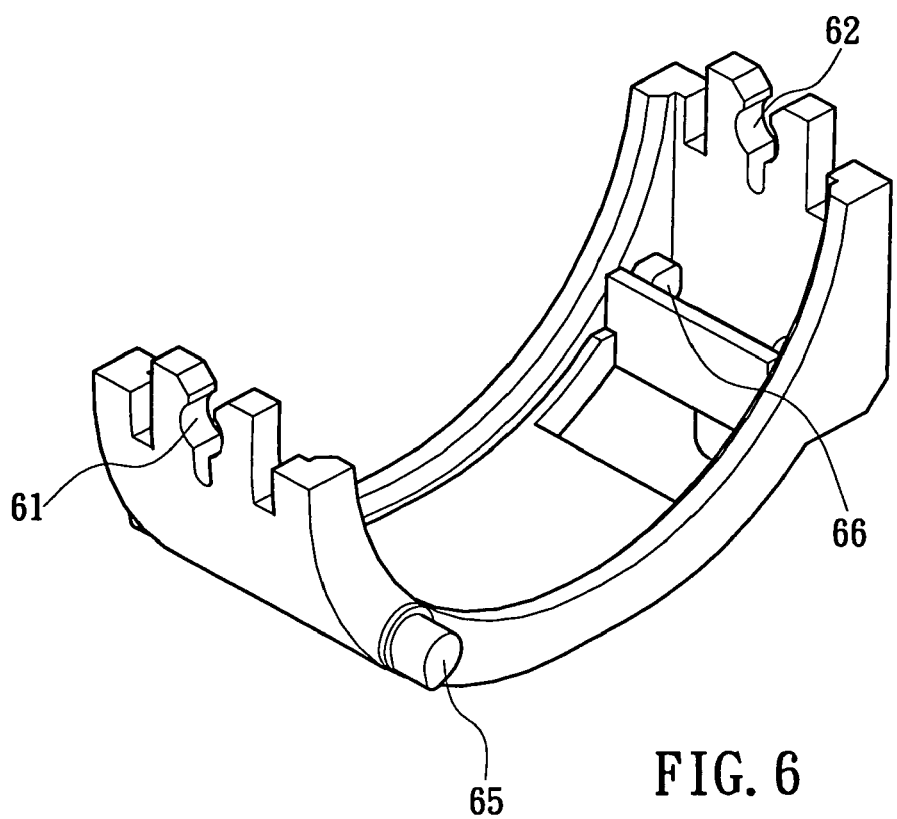
FIG. 6 is an enlarged view of a holder supporting a swing base in accordance with the present invention.
Figure 7:
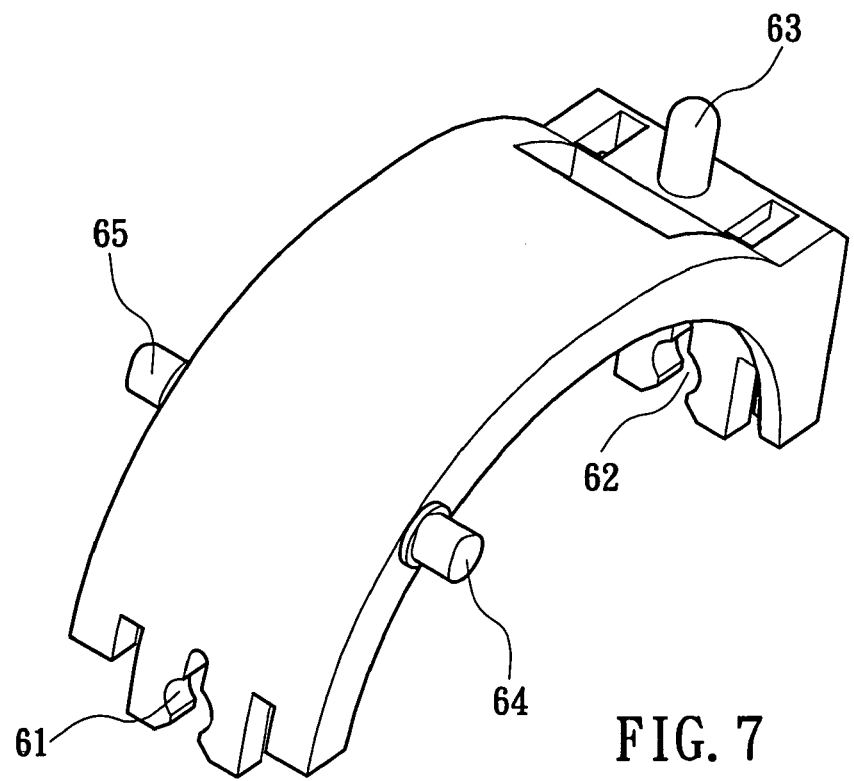
FIG. 7 is a rear view of FIG. 6.

Referring to FIG. 6 and FIG. 7, in the front and the back of the holder 6 that supports the swing base 9, there are slots 61, 62 for holding the front and rear shafts 91, 92. On the left and right sides of the holder 6 are there left and right cam-shafts 64, 65. At the back of the holder 6 is there a fixing slot of momentary spring 66. At the rear bottom of the holder 6 is there a middle contact pin 63.

The left and right cam-shafts 64, 65 of the holder 6 are installed in the holding slots on the two corresponding pillars 12 on the bottom cover 1. The front and rear shafts 91, 92 of the swing base 9 are seated respectively in the front and rear slots 61, 62 of the holder 6. The traverse momentary stick 93 on the swing base 9 inserts into the fixing slot of momentary spring 66 of the holder 6. Two momentary springs 7, 8 are set in the right and left fixing slots of momentary spring 66 respectively, and a traverse momentary stick 93 is inserted between these two momentary springs 7, 8. The left and right contact pins 94, 95 of the swing base 9 correspond to the left and right witches 4, 5 on the circuit board 2, and the middle contact pin 63 at the rear bottom of the holder 6 corresponds to the middle switch 3 on the circuit board 2.

A set of scroll wheel is installed in the swing base 9 and comprises a scroll wheel 10, a mechanical revolving encoder 11, a rubber wheel 13 and a bearing 14. The revolving encoder 11 is fixed to the central shaft of the scroll wheel 10. The bearing 14 is capped at the end of the central shaft, and the rubber wheel 13 covers the outer edge of the scroll wheel 10. The whole set of the scroll wheel is to be installed in the holding slots 96, 97 of the swing base 9. The wire for electrical terminal 11a of the revolving encoder 11 is led from the electric wire slot 98 of the swing base 9. Finally, a top cap 15 covers on the swing base 9 to complete the installation of the computer mouse scroll wheel module.

Figure 8:
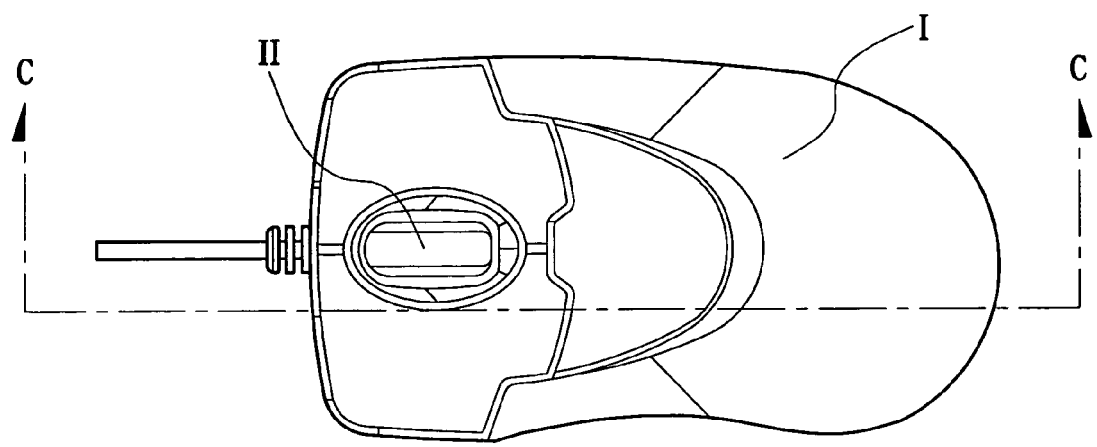
FIG. 8 is top view of a mouse with the present invention.
Figure 9:
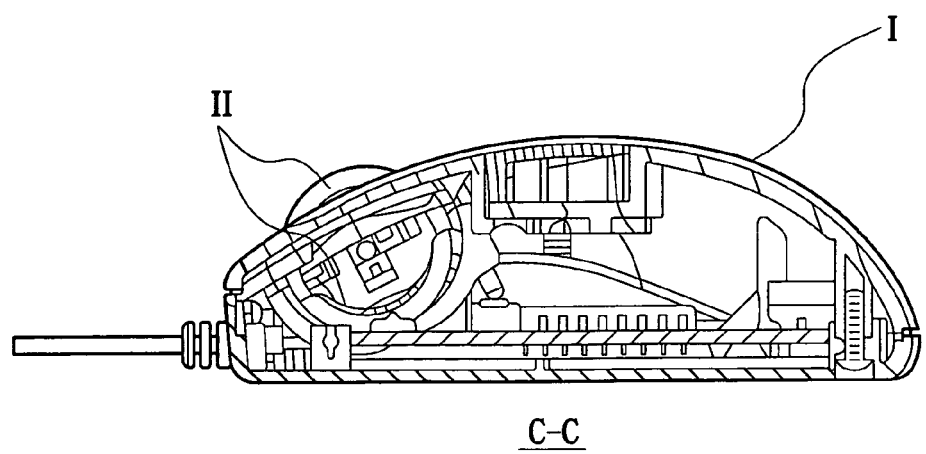
FIG. 9 is a cross sectional view of FIG. 8 along the line C-C.
Figure 10:
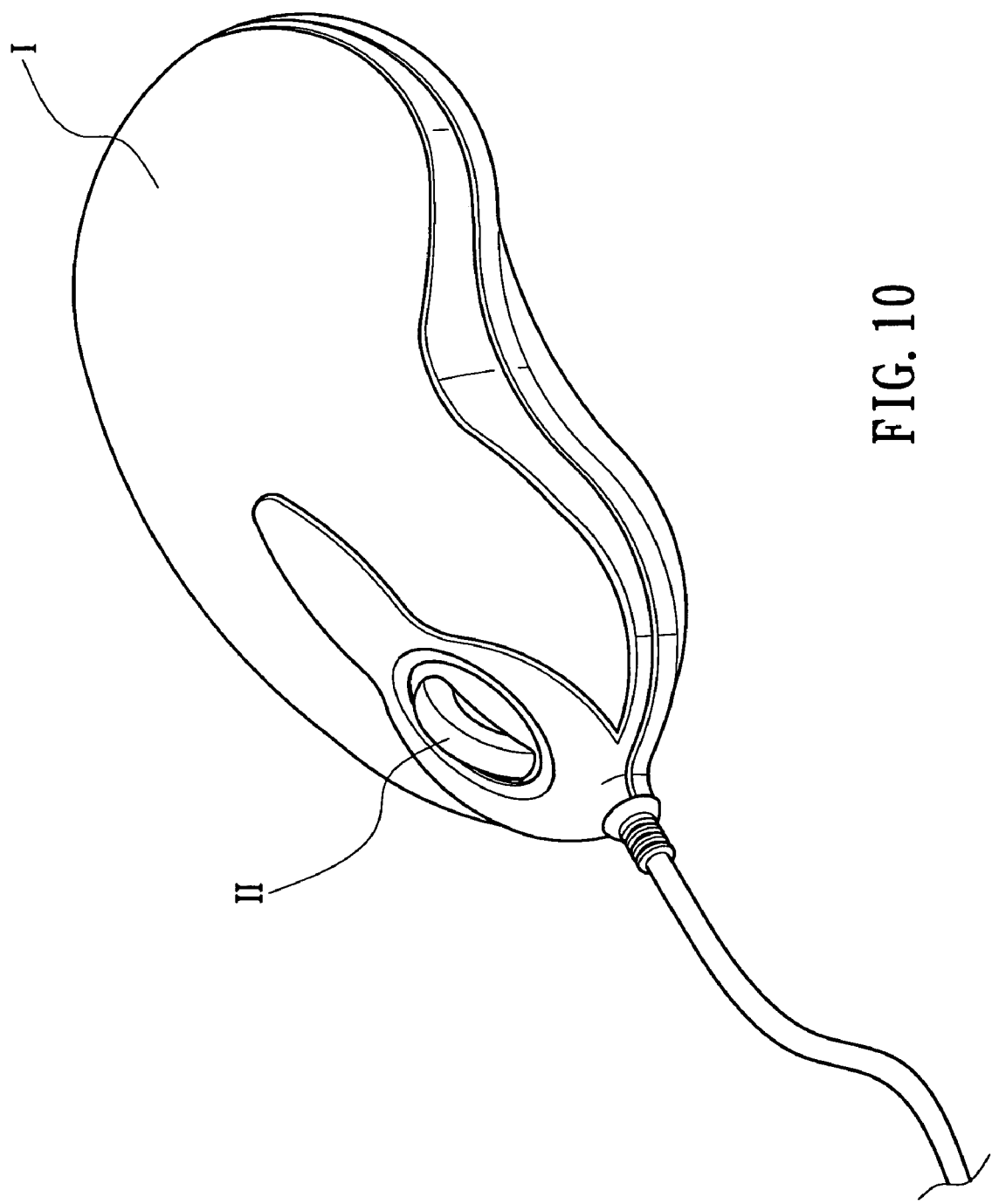
FIG. 10 is a perspective view of an embodiment of a mouse with present invention.

Referring to FIG. 8, FIG. 9 and FIG. 10, the computer mouse comprises a scroll wheel module II installed inside the mouse's body I.

Refer to FIG. 1, FIG. 2, FIG. 3 and FIG. 10. As the scroll wheel 10 of the mouse module II is pushed in left or right direction, the swing base 9 sways in the same direction and makes the left/right contact pins 94/95 on the swing base 9 touch the left/right switches 4/5 on the circuit board 2, scrolling left or right within the currently selected window scrolls.

Since the traverse momentary stick 93 goes into the fixing slot of momentary spring 66 in the holder 6 and sits between the two momentary springs 7, 8, the swing base 9 in the holder 6 is swayed as the scroll wheel 10 is pushed in left or right direction. As the scroll wheel 10 is released, the swing base 9 resumes its position in the holder 6 with the force of the momentary springs 7, 8.

As the scroll wheel 10 is pressed down, the swing base 9 in the holder 6 descends along with the holder 6, leading the middle contact pin 63 at the bottom of the holder 6 to touch the middle switch 3 on the circuit board 2. The push of the scroll wheel 10 acts as the same function as the click of the third (center) button of the mouse. With rotation and push of the scroll wheel 10, the mouse is able to control the scrolling up or down within in the currently selected window.

While only one embodiment of the present invention has been shown and described, it will be understood that various modifications and changes could be made there unto without departing from the spirit and scope of the invention disclosed.

What is claimed is:

1. A computer mouse scroll wheel module comprising a retention part, a holding part sitting on the retention part to swing from front to back and from left to right, and a revolving part installed on the holding part; wherein the scroll wheel module having a mechanical revolving encoder to receive output of encoded electronic signals as the revolving part rotates, and a circuit board having a middle switch as well as left and right switches that is fixed between the retention part and the holding part; wherein the holding part having a swing base and a holder that supports the swing base; a front and a rear shafts of the swing base are disposed respectively in a front slot and rear slots of the holder; wherein a left cam-shaft and a right cam-shaft installed on the left and right sides of the holder are disposed in holding slots on two corresponding pillars on the retention part; wherein a left contact pin and a right contact pin extending outwards are disposed on left and right sides of the swing base while a middle contact pin is set at the rear bottom of the holder; the left and right contact pins correspond to the left and right switches on the circuit board while the middle contact pin corresponds to the middle switch on the circuit board; and a traverse momentary stick on rear bottom of the swing base inserts into the holder; wherein two momentary springs are set in the right and left fixing slots and the traverse momentary stick is inserted between these two momentary springs.

2. The computer mouse scroll wheel module as claimed in claim 1, wherein the revolving part having a scroll wheel, a rubber wheel and a bearing; the rubber wheel covers the outer edge of the scroll wheel while the bearing is capped at the end of a central shaft of the scroll wheel; the mechanical revolving encoder is disposed inside the scroll wheel to form a scroll wheel set that is installed in the holding slots on right and left sides of the swing base.

* * * * *